(12) United States Patent
Derer (10) Patent No.: US 8,891,014 B2
(45) Date of Patent: Nov. 18, 2014

(54) SYSTEMS AND METHODS FOR LATENCY STABILIZATION OVER AN IP NETWORK

(75) Inventor: Renaud Derer, Saint-André-Lez-Lille (FR)

(73) Assignee: Barco NV, Kortrijk (BE)

( * ) Notice: Subject to any disclaimer, the term of this patent is extended or adjusted under 35 U.S.C. 154(b) by 180 days.

(21) Appl. No.: 13/552,724

(22) Filed: Jul. 19, 2012

(65) Prior Publication Data
US 2014/0022457 A1    Jan. 23, 2014

(51) Int. Cl.
*H03L 7/00* (2006.01)
*H04L 29/06* (2006.01)
*H04N 5/12* (2006.01)

(52) U.S. Cl.
CPC ........ *H04L 29/06* (2013.01); *H04N 5/126* (2013.01)
USPC ........ 348/536; 348/500; 348/513; 348/14.12; 709/232; 709/248; 375/362; 725/118

(58) Field of Classification Search
CPC ....... H04N 5/04; H04N 5/0736; H04N 7/147; H04N 5/06; H04N 5/067; H04N 5/907; H05N 9/896; H04L 29/06; H04L 29/0854
USPC ............... 348/500, 513, 514, 14.12; 725/118; 709/232, 248
See application file for complete search history.

(56) References Cited

U.S. PATENT DOCUMENTS

| | | | |
|---|---|---|---|
| 6,754,234 B1 * | 6/2004 | Wiesner et al. | 370/503 |
| 7,724,780 B2 * | 5/2010 | Baird et al. | 370/509 |
| 2013/0033612 A1 * | 2/2013 | Wu et al. | 348/208.6 |

\* cited by examiner

*Primary Examiner* — Jeffrey Harold
*Assistant Examiner* — Omer Khalid
(74) *Attorney, Agent, or Firm* — Troutman Sanders LLP; Ryan A. Schneider; Dustin B. Weeks (57) ABSTRACT

An exemplary embodiment of the present invention provides a latency stabilization system for stabilizing the display latency between a source and a renderer over an IP network. The latency stabilization system comprises a frequency syntonization module, a frequency lock detection module, and a phase correction module. The frequency syntonization module can be configured to syntonize a frequency of a source signal from the source and a frequency of a display signal to be displayed on the renderer. The frequency lock detection module can be configured to detect whether the frequency of the source signal and the frequency of the display signal are locked. The phase correction module can be configured to, synchronize a phase of the source signal and a phase of the display signal, and generate correction data based in part on synchronization of the phase of the source signal and the phase of the display signal.

26 Claims, 7 Drawing Sheets

```
Travel time
TWSof - TSource => MinTravelTime
MinTravelTime / FracPointRatio => MinTravelTime
if (MinTravelTime > 1) => Branch "MeanMinTravelTime calculation"
1 => MinTravelTime
MinTravelTime - MeanMinTravelTimeN-1 => MeanMinTravelTimeN
MeanMinTravelTimeN / 32
MeanMinTravelTimeN + MeanMinTravelTimeN-1 => MeanMinTravelTimeN
MeanMinTravelTimeN => MeanMinTravelTimeN-1
```
```
Error calculation
TWSof => TimeSetPosN
TRenderer => TimeActualPosN
DeltaPhaseN => DeltaPhaseN-1
TimeActualPosN - TimeSetPosN => DeltaPhaseN
DeltaPhaseN / FracPointRatio => DeltaPhaseN
DeltaPhaseN + TimeOffsetVar => DeltaPhaseN
DeltaPhaseN * Kp => ErrorOutput
DeltaPhaseIntegral + DeltaPhaseN => DeltaPhaseIntegral
DeltaPhaseN - DeltaPhaseN-1 => DeltaPhaseDerivate
if (DeltaPhaseIntegral < ClipIntegralSub) => Branch Lowest
ClipIntegralSub => DeltaPhaseIntegral
Branch PID section
if (DeltaPhaseIntegral > ClipIntegralLow) => Branch PID section
ClipIntegralLow => DeltaPhaseIntegral
```
```
PID
DeltaPhaseIntegral * Ki => TempBuf
ErrorOutput + TempBuf => ErrorOutput
DeltaPhaseDerivate * Kd => TempBuf
ErrorOutput + TempBuf => ErrorOutput
```
```
Correction clipping
if (ErrorOutput < ClipOutputSub) => Branch LowTest
ClipOutputSub => ErrorOutput
Update Flag register (Clipped = 1)
Branch "Decrement LockFilter"
if (ErrorOutput > ClipOutputLow) => Branch "Clipped = 0"
ClipOutputLow => ErrorOutput
Update Flag register (Clipped = 1)
Branch "Decrement LockFilter"
Update Flag register (Clipped = 0)
```

Figure 4A

```
Lock detection
ErrorOutput - ErrorOutputN-1 => OutputDerivate
ErrorOutput => ErrorOutputN-1
if (OutputDerivate < LockThresholdSub) => Branch Lowest
Branch "Decrement LockFilter"
if (OutputDerivate > LockThresholdLow) => Branch "Increment LockFilter"

LockFilter - 1 => LockFilter                         !!! DECREMENT LOCKFILTER
if (LockFilter > 1) => Branch "Going low"
1 => LockFilter
if (LockVariable == NOTLOCKED) => Branch "Locked = 0"   !!! GOING LOW
if (LockFilter < LockFilterLow) => Branch "Locked = 0"
Branch "Locked = 1"

LockFilter + 1 => LockFilter                         !!! INCREMENT LOCKFILTER
if (LockFilter < LockFilterMax) => Branch "Going High"
LockFilterMax => LockFilter
if (LockVariable == LOCKED) => Branch "Locked = 1"      !!! GOING HIGH
if (LockFilter > LockFilterHigh) => Branch "Locked = 1"
Branch "Locked = 0"
```

```
Locked = FALSE
TimeOffsetFix => TimeOffsetVar                       !!! LOCKED = 0
Update Flags register (Locked = 0)
Update variable register (Locked = 0)
1 => LockPhaseFilter
Branch "Latency section"
```

```
Locked = TRUE
Update Flags register (Locked = 1)                   !!! LOCKED = 1
Update variable register (Locked = 1)
Update Flags register (ForceOpenLoop = 1)
```

```
SlowLock LockPhase filter
LockPhaseFilter + 1 => LockPhaseFilter               !!! LOCKPHASEFILTER
if (LockPhaseFilter < LockPhaseFilterMax) => Branch "Latency"
LockFilterMax => LockPhaseFilter
Update Flags register (ForceOpenLoop = 0)
```

Figure 4B

```
Latency set point
TWSof - TWSofN-1 => InputWriteTime            !!! LATENCY SetPoint
TWSof => TWSofN-1
InputWriteTime / FracPointRatio => InputWriteTime
OutputReadTime => InputWriteTime / ReadOverWriteTimeRatio
MeanMinTravelTime + LatencyMargin => LatencySP
LatencySP + InputWriteTime => LatencySP
LatencySP - OutputWriteTime => LatencySP
if (LatencySP > LatencyEP) => Branch "Latency adjust"
LatencyEP => LatencySP
```
```
Error Latency
LatencyAP - LatencySP => ErrorLatency         !!! LATENCY ADJUST
ErrorLatency / xx => ErrorLatency
if (ErrorLatency < ClipErrorLatencySub) => Branch Lowest
ClipErrorLatencySub => ErrorLatency
Branch "TimeOffset"
if (ErrorLatency > ClipErrorLatencyLow) => Branch "TimeOffset"
ClipErrorLatencyLow => ErrorLatency
Error latency integration
ErrorLatency => TimeOffsetInc                 !!! TIMEOFFSET
TimeOffsetVar + TimeOffsetInc => TimeOffsetVar
```
```
Instantaneous latency estimation
TRendererN + TRendererN => TempBuf            !!! LATENCY
TempBuf - TRendererN-1 => TempBuf
TempBuf - TSource => LatencyAP
LatencyAP / FracPointRatio => LatencyAP
if (LatencyAP > 1) => Branch "Copy LatencyAP"
LatencyAPN-1 => LatencyAP
LatencyAP => LatencyAPN-1
TRenderer => TRendererN-1
```
```
Wait next kick of tWSof
Wait
Branch 00
```

Figure 4C

SYSTEMS AND METHODS FOR LATENCY STABILIZATION OVER AN IP NETWORK

TECHNICAL FIELD OF THE INVENTION

The various embodiments of the present disclosure relate generally to data transmission. More particularly, the various embodiments of the present invention are directed to devices, systems, and methods for latency stabilization of data transmissions over an internet protocol ("IP") network.

BACKGROUND OF THE INVENTION

In a typical broadcast system, it is often desirable to combine the audio and/or video ("AV") signals generated at multiple sources, such as video cameras, together at a common renderer, such as a computer monitor or other display. Additionally, it may be desirable to synchronize the display of an image from a source at a plurality of renderers. Conventional methods for accomplishing these goals have employed a variety of techniques. One such technique is known as GenLock. GenLock employs an external signal generator used to manipulate a plurality of AV sources to ensure those sources are transmitting the AV signals synchronized. For example, multiple cameras may be manipulated to ensure that each camera is transmitting video frames at the same time. Thus, GenLock requires manipulation at the source level of the AV transmission.

Conventionally, many multimedia communication systems employed imbedded networks for transmissions between a source and renderer. In recent years, however, it has become desirable for IP-based solutions to multimedia communications. Multimedia transmissions over an IP network will have significant advantages over conventional imbedded systems, including decreased cost of infrastructure, greater scalability, and greater routing capabilities. The introduction of IP based multimedia communication, however, leads to increased issues with latency. Latency can be defined as the delay between a change at the input of a system and the corresponding output of the system. For example, with video data transmissions, end-to-end latency can be the time between transmission of a video frame by a source and display of the frame by a renderer. The latency can be affected by many factors, such as processing speed and network delay. Many conventional systems attempt only to control latency by decreasing latency as much as possible. Unfortunately, these systems allow the display latency to oscillate, i.e. change frame to frame, throughout the data transmissions, leading to undesirable jitter in the display of the signal. This is especially problematic for applications where latency oscillation is unacceptable, such as in systems for conducting remote medical procedures.

Therefore, there is a desire for systems and methods for stabilizing the latency of a AV data transmission over an IP network, wherein the latency stabilization takes place substantially at the renderer level. Various embodiments of the present invention address these desires.

BRIEF SUMMARY OF THE INVENTION

The present invention relates to latency stabilization over an IP network. An exemplary embodiment of the present invention provides a method of stabilizing display latency in a video transmission over an IP network, the method comprising receiving a source signal from a source via an IP network, the signal comprising data associated with a plurality of source frames, each source frame in the plurality of source frames associated with a distinct timestamp from a common clock shared between the source and a renderer, each source frame indicative of an image to be displayed on a renderer, generating a display signal comprising data associated with a plurality of display frames, each display frame corresponding to a source frame, the display signal configured to cause the renderer to display the image, and stabilizing a display latency between the plurality of source frames in the source signal and the plurality of display frames in the display signal, such that the display latency is substantially non-oscillating.

In accordance with some embodiments of the present invention, stabilizing the display latency between the plurality of source frames in the source signal and the plurality of display frames in the display signal comprises syntonizing a frequency of the source signal and a frequency of the display signal.

In accordance with some embodiments of the present invention, stabilizing the display latency between the plurality of source frames in the source signal and the plurality of display frames in the display signal comprises detecting whether the frequency of the source signal and the frequency of the display signal are locked.

In accordance with some embodiments of the present invention, stabilizing the display latency between the plurality of source frames in the source signal and the plurality of display frames in the display signal comprises synchronizing a phase of the source signal and a phase of the display signal, if the frequency of the source signal and the frequency of the display signal are locked.

In accordance with some embodiments of the present invention, stabilizing the display latency between the plurality of source frames in the source signal and the plurality of display frames in the display signal comprises generating correction data based in part on synchronization of the phase of the source signal and the phase of the display signal, if the frequency of the source signal and the frequency of the display signal are locked.

In accordance with some embodiments of the present invention, stabilizing the display latency between the plurality of source frames in the source signal and the plurality of display frames in the display signal comprises re-syntonizing the frequency of the source signal and the frequency of the display signal using the correction data, if the frequency of the source signal and the frequency of the display signal are locked.

In accordance with some embodiments of the present invention, the plurality of source frames in the source signal are timestamped via at least one of an RTP protocol and an RTCP protocol.

In accordance with some embodiments of the present invention, the common clock is tuned by a network precision time protocol.

In accordance with some embodiments of the present invention, the display latency is not greater than a time a display frame is displayed on the renderer.

In accordance with some embodiments of the present invention, the display latency is greater than a time a display frame is displayed.

In accordance with some embodiments of the present invention, generating correction data comprises determining a best case display latency based on a travel time of the IP network and a video processing time, generating a display latency set point based on the best case display latency and an expected latency parameter, determining an actual display latency, and subtracting the display latency set point from the actual display latency.

In accordance with some embodiments of the present invention, generating the display latency set point comprises setting the display latency set point equal to the expected latency if the display latency set point is less than the expected latency.

In accordance with some embodiments of the present invention, determining actual display latency comprises subtracting a source timestamp associated with a source frame from a display timestamp associated with a corresponding display frame, wherein the source timestamp and the display timestamp are generated by the common clock.

In accordance with some embodiments of the present invention, detecting whether the frequency of the source signal and the frequency of the display signal are locked comprises evaluating a correction factor.

In accordance with some embodiments of the present invention, the frequency of the source signal and the frequency of the display signal are locked if an absolute value of a derivative of the correction factor is below a predetermine threshold.

In accordance with some embodiments of the present invention, at least one of syntonizing and re-syntonizing the frequency of the source signal and the frequency of the display signal comprises adjusting a pixel clock component of the display signal.

In accordance with some embodiments of the present invention, at least one of syntonizing and re-syntonizing the frequency of the source signal and the frequency of the display signal comprises adjusting a blanking period of the display signal.

Another exemplary embodiment of the present invention provides a method of stabilizing display latency between a source and a renderer over an IP network, such that the display latency between the source and the renderer is substantially non-oscillating. The method comprises syntonizing a frequency of the source signal and a frequency of the display signal, detecting whether the frequency of the source signal and the frequency of the display signal are locked, and if the frequency of the source signal and the frequency of the display signal are locked, synchronizing a phase of the source signal and a phase of the display signal, generating correction data based in part on synchronization of the phase of the source signal and the phase of the display signal, and re-syntonizing the frequency of the source signal and the frequency of the display signal using the correction data.

In addition to methods of stabilizing display latency in a data transmission over an IP network, the present invention also provides systems for stabilizing display latency in a video transmission over an IP network. An exemplary embodiment of the present invention provides a system for stabilizing display latency in a video transmission over an IP network comprising a receiver and a latency stabilization module.

In accordance with some embodiments of the present invention, the receiver is configured to receive a source signal from a source via an IP network, the signal comprising data associated with a plurality of source frames, each source frame in the plurality of source frames associated with a distinct timestamp from a common clock shared between the source and a renderer, each source frame indicative of an image to be displayed on a renderer.

In accordance with some embodiments of the present invention, the latency stabilization module is configured to generate a display signal comprising data associated with a plurality of display frames, each display frame corresponding to a source frame, the display signal configured to cause the renderer to display the image, the latency stabilization module further configured to stabilize a display latency between the plurality of source frames in the source signal and the plurality of display frames in the display signal, such that the display latency is substantially non-oscillating.

In accordance with some embodiments of the present invention, the latency stabilization module comprises a frequency syntonization module configured to syntonize a frequency of the source signal and a frequency of the display signal.

In accordance with some embodiments of the present invention, the latency stabilization module comprises a frequency lock detection module configured to detect whether the frequency of the source signal and the frequency of the display signal are locked.

In accordance with some embodiments of the present invention, the latency stabilization module comprises a phase correction module.

In accordance with some embodiments of the present invention, the phase correction module is configured to synchronize a phase of the source signal and a phase of the display signal, if the frequency of the source signal and the frequency of the display signal are locked.

In accordance with some embodiments of the present invention, the phase correction module is configured to generate correction data based in part on synchronization of the phase of the source signal and the phase of the display signal, if the frequency of the source signal and the frequency of the display signal are locked.

In accordance with some embodiments of the present invention, the frequency syntonization module is configured to re-syntonize the frequency of the source signal and the frequency of the display signal using the correction data.

In accordance with some embodiments of the present invention, the phase correction module is configured to determine a best-case display latency based on a travel time of the IP network and a video processing time.

In accordance with some embodiments of the present invention, the phase correction module is configured to generate a display latency set point based on the best case display latency and an expected latency parameter.

In accordance with some embodiments of the present invention, the phase correction module is configured to determine an actual display latency.

In accordance with some embodiments of the present invention, the phase correction module is configured to subtract the display latency set point from the actual display latency.

In accordance with some embodiments of the present invention, the phase correction module is configured to generate the display latency set point by setting the display latency set point equal to the expected latency if the display latency set point is less than the expected latency.

In accordance with some embodiments of the present invention, the phase correction module is configured to determine the actual display latency by subtracting a source timestamp associated with a source frame from a display timestamp associated with a corresponding display frame, wherein the source timestamp and the display timestamp are generated by the common clock.

In accordance with some embodiments of the present invention, the frequency lock detection module is configured to detect whether the frequency of the source signal and the frequency of the display signal are locked by evaluating a correction factor generated by the frequency syntonization module.

In accordance with some embodiments of the present invention, the frequency syntonization module is configured to adjust a pixel clock component of the display signal.

In accordance with some embodiments of the present invention, the frequency syntonization module is configured to adjust a blanking period of the display signal.

Another exemplary embodiment of the present invention provides a latency stabilization system for stabilizing the display latency between a source and a renderer over an IP network, such that display latency between the source and the renderer is substantially non-oscillating. The latency stabilization system comprises a frequency syntonization module, a frequency lock detection module, and a phase correction module. The frequency syntonization module can be configured to syntonize a frequency of a source signal from the source and a frequency of a display signal to be displayed on the renderer. For example, in some embodiments of the present invention, the frequency syntonization module is configured to syntonize the frequency of the vertical synchronization component of the source signal and the frequency of the vertical synchronization component of the display signal. The frequency lock detection module can be configured to detect whether the frequency of the source signal and the frequency of the display signal are locked. The phase correction module can be configured to, if the frequency of the source signal and the frequency of the display signal are locked, synchronize a phase of the source signal and a phase of the display signal, and generate correction data based in part on synchronization of the phase of the source signal and the phase of the display signal. The frequency syntonization module can be further configured to re-syntonize the frequency of the source signal and the frequency of the display signal using the correction data.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The following Detailed Description of the Invention is better understood when read in conjunction with the appended drawings. For the purposes of illustration, there is shown in the drawings exemplary embodiments, but the subject matter is not limited to the specific elements and instrumentalities disclosed.

FIGS. 4A-4C provide pseudo code for implementing a latency stabilization module, in accordance with an exemplary embodiment of the present invention.

DETAILED DESCRIPTION OF THE INVENTION

To facilitate an understanding of the principles and features of the present invention, various illustrative embodiments are explained below. To simplify and clarify explanation, the invention is described below as applied to video transmissions. One skilled in the art will recognize, however, that the invention is not so limited. Instead, as those skilled in the art would understand, the various embodiments of the present invention also find application in other areas, including, but not limited to, audio transmissions, multimedia transmissions, and the like. The various embodiments of the present invention offer significant advantages over conventional systems, methods, and devices in applications where it is desirable to stabilize display latency between a source and a renderer over an IP network.

The components, steps, and materials described hereinafter as making up various elements of the invention are intended to be illustrative and not restrictive. Many suitable components, steps, and materials that would perform the same or similar functions as the components, steps, and materials described herein are intended to be embraced within the scope of the invention. Such other components, steps, and materials not described herein can include, but are not limited to, similar components or steps that are developed after development of the invention.

Figure 1:
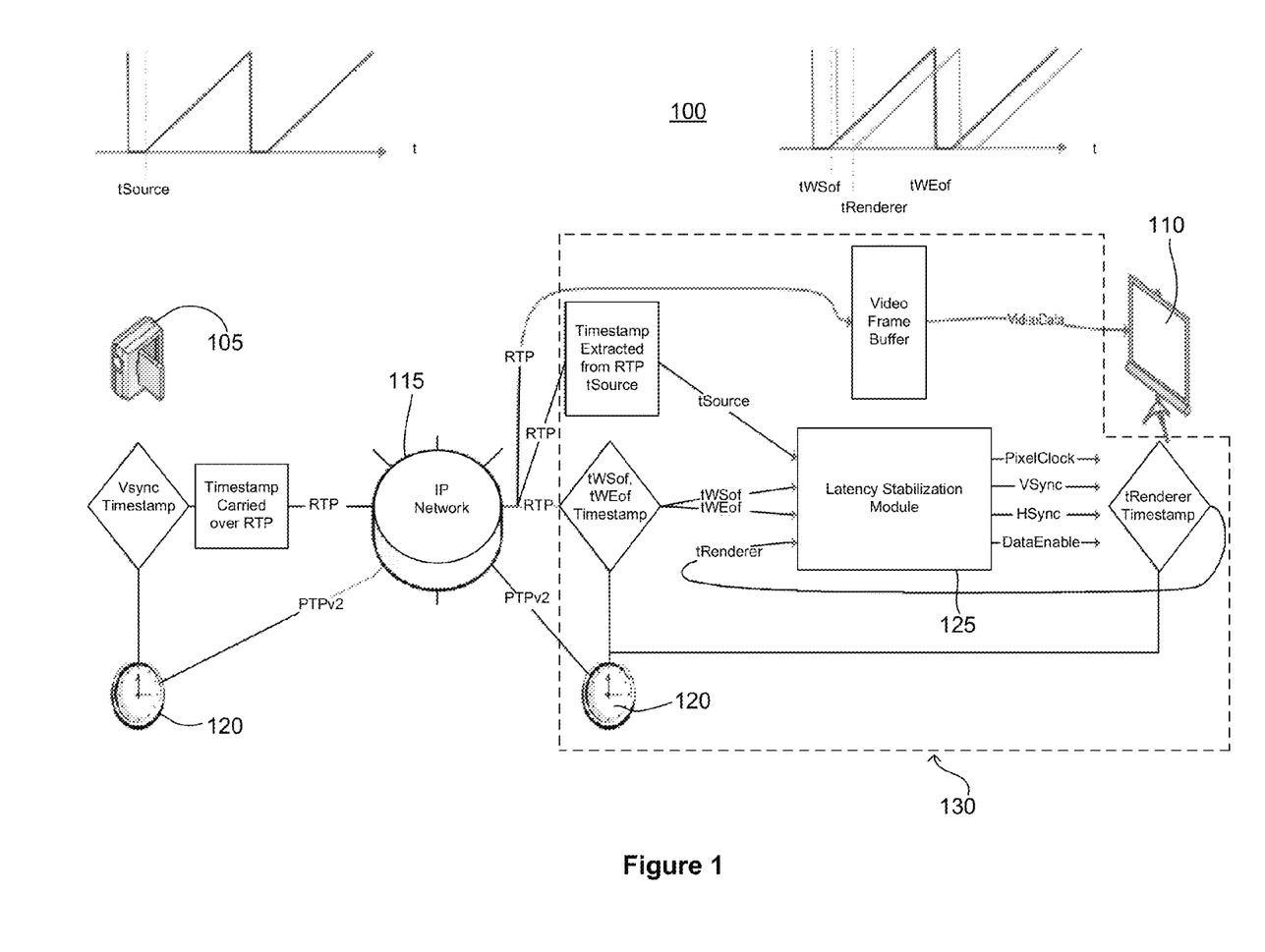
FIG. 1 provides an AV data transmission system, in accordance with an exemplary embodiment of the present invention.

FIG. 1 illustrates an AV data transmission system 100, in accordance with an exemplary embodiment of the present invention. The data transmission system 100 can be used to transmit a signal from a source 105, through an IP network 115, e.g. the internet, where the source signal can be received by a receiver 130. The receiver 130 can be many receivers known in the art. The source signal can then be processed by a latency stabilization module 125 to generate a display signal. The display signal can be transmitted to a renderer 110. The renderer can be many renderers known in the art, including, but not limited to, a television, a computer monitor, and the like. If, for example, the source signal is a video signal, the source signal can comprise data associated with a plurality of source frames. The source frames can be indicative of an image to be displayed on a video renderer 110. In accordance with some exemplary embodiments of the present invention, the latency stabilization module 125 can be configured to generate a display signal comprising data associated with a plurality of display frames, each display frame corresponding to a source frame. The display signal can be configured to cause the renderer 110 to display the image.

Some exemplary embodiments of the present invention provide a latency stabilization module 125 employed at the renderer side of the transmission system. In some embodiments of the present invention, the latency stabilization module 125 can be integrated with the receiver 130, as shown in FIG. 1. In some embodiments of the present invention, however, the latency stabilization module 125 can be independent of, but in communication with, the receiver 130. The latency stabilization module 125 can be used to allow for synchronizing the source 105 and the renderer 110 in frequency and in phase over the IP network 115. The latency stabilization module 125 can syntonize the source 105 and renderer 110, such that video frames are displayed at the render 110 at substantially the same pace, i.e. frequency, as generated by the source 105. For example, in some embodiments of the present invention, the latency stabilization module 125 can syntonize the vertical synchronization components of the source and display signals. The latency stabilization module 125 can also synchronize the phase of the source 105 and renderer 110, such that the display latency between the source 105 and renderer 110 is stabilized, i.e. substantially non-oscillating.

The display latency can be stabilized at many different values and can be based on many factors in accordance with various exemplary embodiments of the present invention. In some embodiments of the present invention, the display latency is stabilized at a value below the display frame duration, i.e. the time each frame is to be displayed on the renderer. For example, if the display frame rate is 60 Hz, then the display latency does not exceed 16 ms. In some embodiments of the present invention, however, the display latency is stabilized at a value greater than the display frame duration. In some embodiments of the present invention, the display latency is stabilized at value substantially equal to the display frame duration. In some embodiments of the present invention, the display latency is based on the performance of the IP network 115 and/or processing capabilities of devices on the source 105 and renderer 110 side of the transmission system 100.

Several embodiments of the present invention accomplish these goals, in part, by placing the source 105 subsystem and the renderer 110 subsystem in communication with a common clock reference 120. The common clock 120 can be tuned via many methods, including but not limited to, network time precision protocol, precision time protocol ("PTP"), and the like. Based on the common clock 120, the transmission system 100 can employ time stamping of the source frames based on time data generated by the common clock 120. The source frames can be time stamped in accordance with many methods known in the art, including, but not limited to, an RTP protocol, and RTCP protocol, and the like.

The various embodiments of the present invention find application in unicast and/or multicast transmission systems. Thus, in accordance with some exemplary embodiments of the present invention, the transmission system 100 can comprise one or more sources 105. In accordance with some embodiments of the present invention, the transmission system 100 can comprise one or more renderers 110.

Figure 2A:
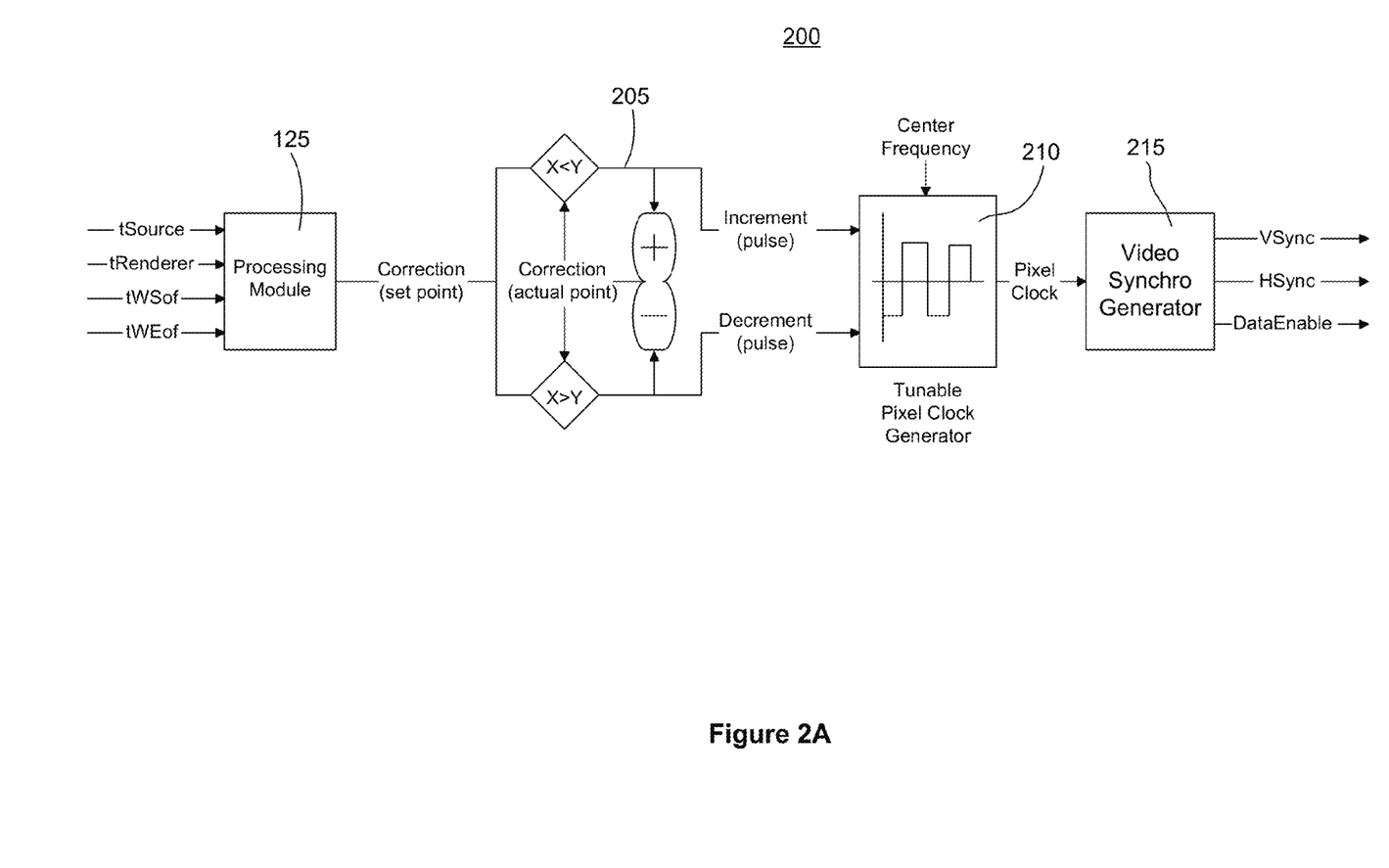
FIG. 2A provides an implementation of a latency stabilization module for pixel clock tuning, in accordance with an exemplary embodiment of the present invention.
Figure 2B:
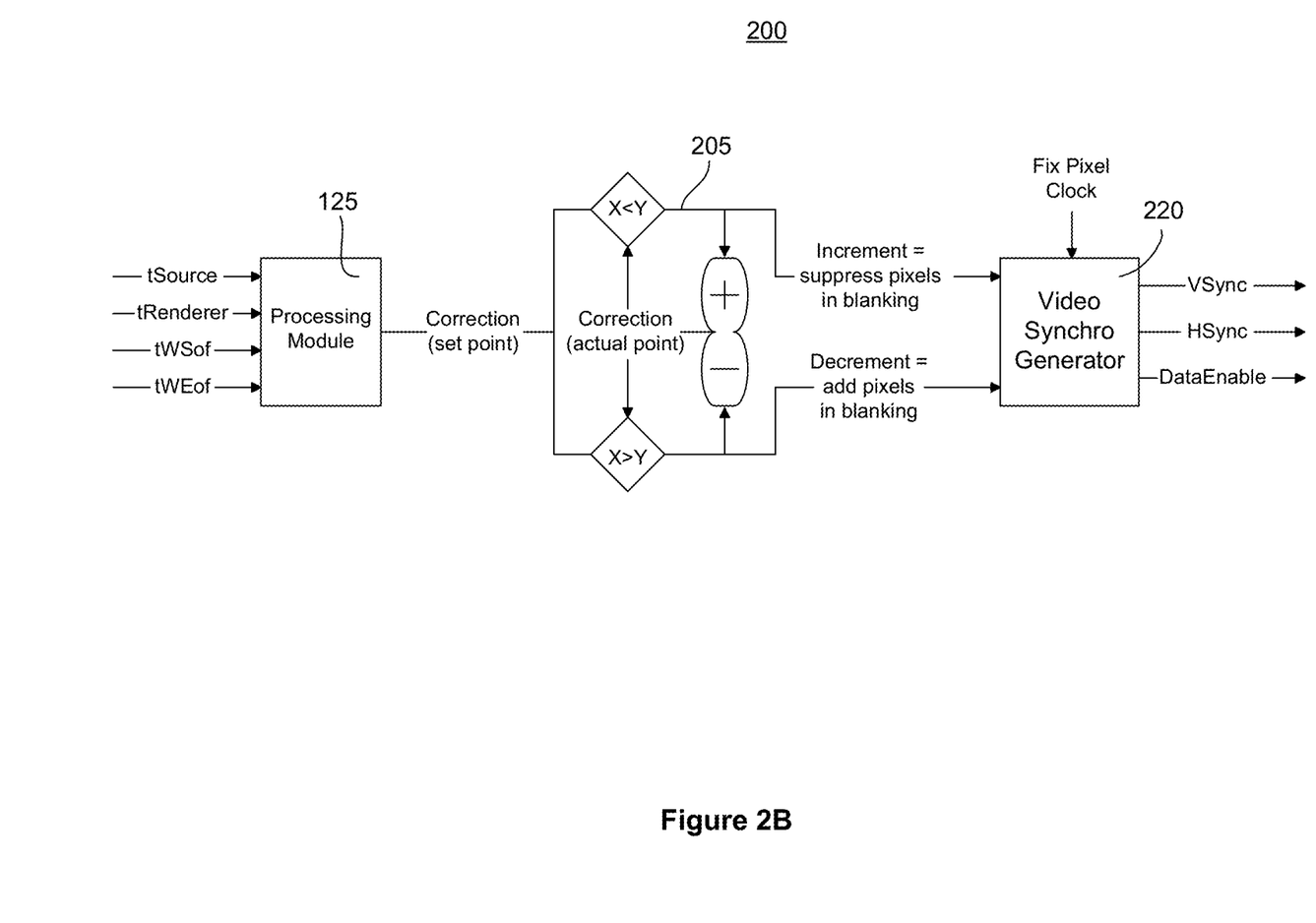
FIG. 2B provides an implementation of a latency stabilization module for blanking period tuning, in accordance with an exemplary embodiment of the present invention.
Figure 3:
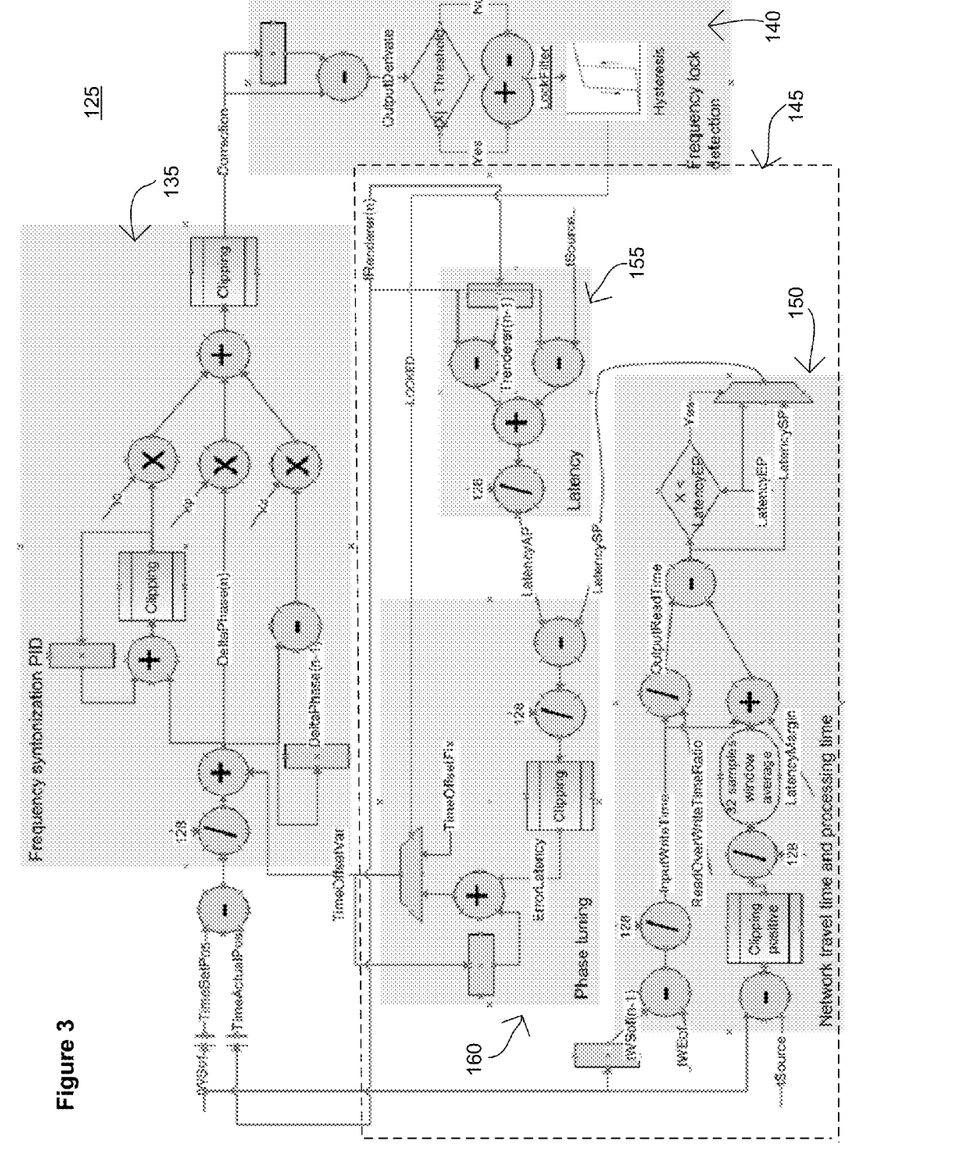
FIG. 3 provides a schematic of a latency stabilization module, in accordance with an exemplary embodiment of the present invention.
Figure 4B:
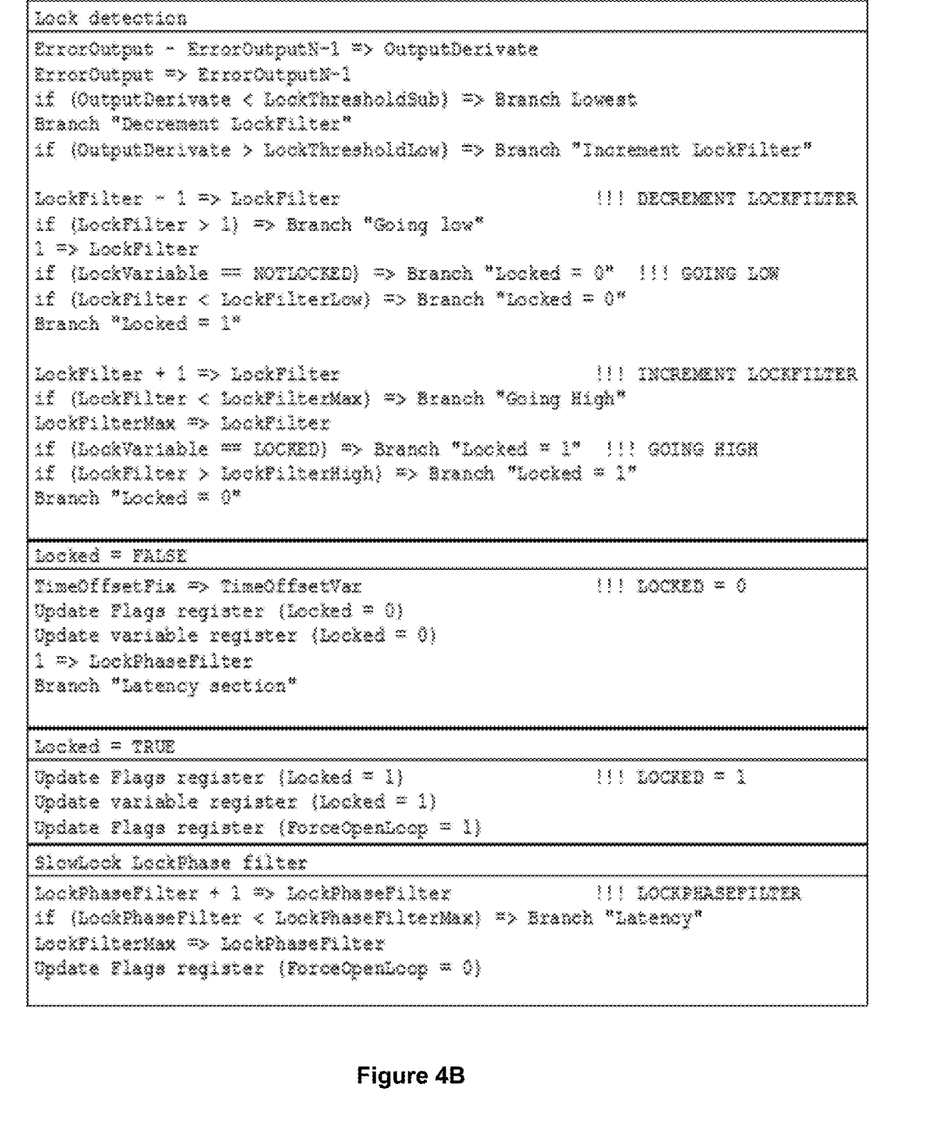
Figure 4C:
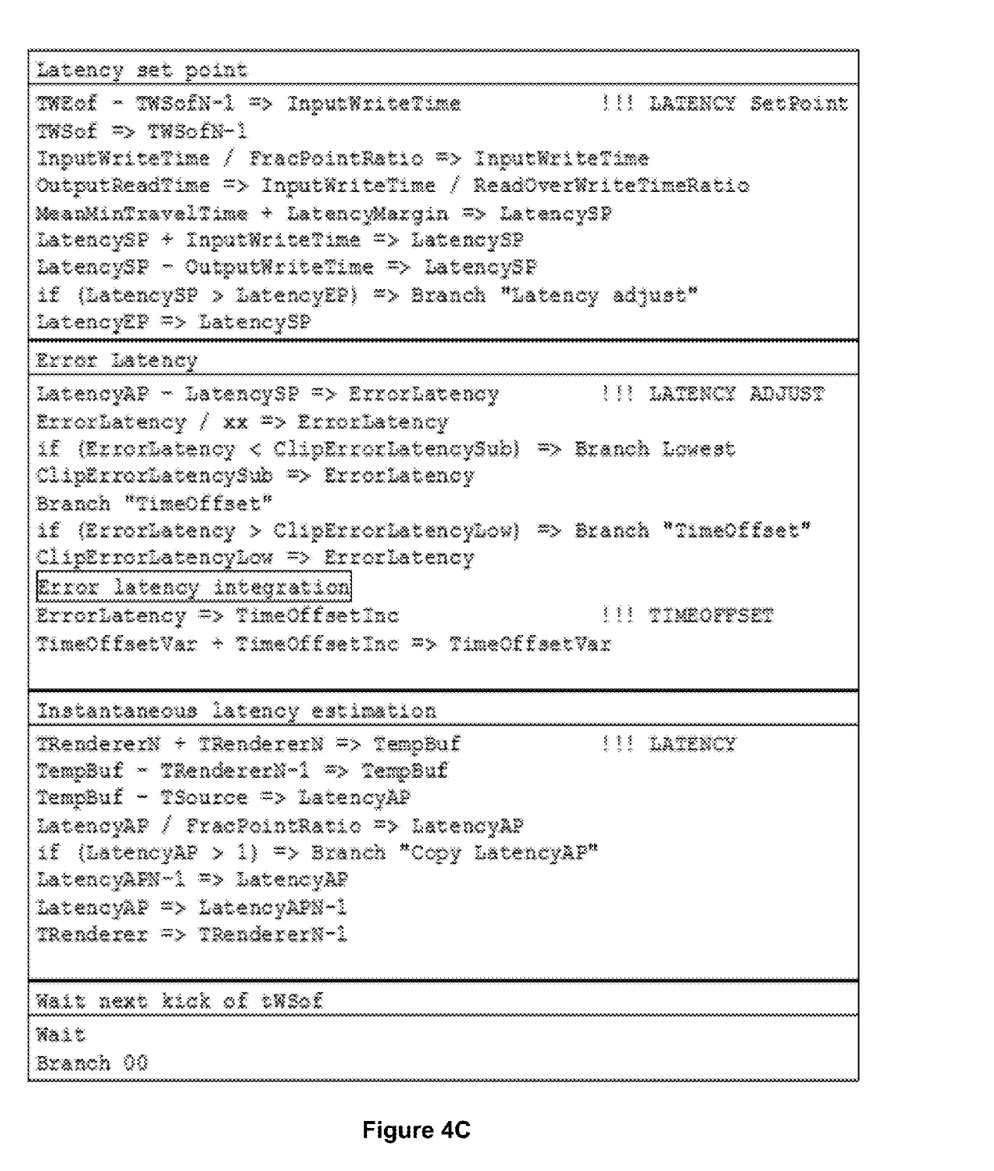

In some exemplary embodiments of the present invention, the latency stabilization module 125 receives one or more of the following four signals as inputs: tSource; tRenderer; tWSof; and tWEof. tSource represents the absolute timestamp of the source frame (This value can travel over the IP network attached to the source frame in the source signal). tRenderer represents the absolute timestamp of the renderer frame. tWSof represents the absolute timestamp of the time when the first pixel of a frame is received from the IP network 115 at the renderer level. tWEof represents the absolute timestamp of the time when the last pixel of a frame is received from the IP network 115 at the renderer level. As those skilled in the art would understand, the data in the aforementioned input signals can be provided to the latency stabilization module 125 via different numbers of signals, e.g. one signal, two signals, five signals, etc., which should be included within the scope of the present invention. For purposes of illustration only, and not to be interpreted as limiting, four input signals are illustrated in FIGS. 1-3.

As discussed above, the latency stabilization module 125 can be configured to generate a display signal as an output. In some exemplary embodiments of the present invention, the display signal comprises one or more of the following four components or sub-signals: PixelClock; VSync; HSync; and DataEnable. PixelClock represents a clock at the frequency of the pixel publication on the renderer 110. VSync, which can be synchronous upon PixelClock, indicates when the rendered frame begins, e.g. upon a rising edge. HSync indicates the beginning of each line within a frame. DataEnable, which can be synchronous upon PixelClock, validates the current pixel data when asserted. As those skilled in the art would understand, the data in the aforementioned output sub-signals can be generated by the latency stabilization module 125 via different numbers of signals, e.g. one signal, two signals, five signals, etc., which should be included within the scope of the present invention. For purposes of illustration only, and not to be interpreted as limiting, four output sub-signals are illustrated in FIGS. 1-3.

In some exemplary embodiments of the present invention, the latency stabilization module 125 can employ one or more parameters. In some embodiments of the present invention, the latency stabilization module 125 uses at least one of the following parameters: LatencyEP; LatencyMargin; and ReadOverWriteTimeRatio. LatencyEP represents the latency expected point, which is the substantially best case latency point the system 100 attends to reach. The display latency, as described with reference to the embodiment shown in FIG. 3, is the time elapsed between the VSync at source 105 level and its corresponding VSync at the renderer 110 level. LatencyMargin represents extra margin to compensate for network travel time jitter. ReadOverWriteTimeRatio can be used for situations when the rendering format is not the same as the source format, e.g. image resize processing at the renderer 110 level. In these cases, latency may be compensated on the fly, especially if the system is intended to render the frame with sub-frame latency, i.e. starting to render the frame before having received it in total. For example, if the ReadOverWriteTimeRatio is not equal to one, the latency reachable point may be corrected accordingly. As those skilled in the art would understand, the data in the aforementioned parameters can be generated by the latency stabilization module 125 via different numbers of parameters, e.g. one parameter, two parameters, five parameters, etc., which should be included within the scope of the present invention. For purposes of illustration only, and not to be interpreted as limiting, the three parameters described above are illustrated in FIG. 3.

The names used herein when referring to the various input signals, output signals, output sub-signals, and parameters are used only for the purpose of simplifying the illustration of the exemplary embodiments described herein; those names should not be interpreted as limiting the disclosure of the present invention. Further, the aforementioned lists of input signals, output signals, output sub-signals, and parameters are intended to be illustrative of those used by some exemplary embodiments of the present invention. The lists are not exclusive. Instead, as those skilled in the art would understand, other input signals, output signals, output sub-signals, and parameters may be employed in accordance with the scope of the present invention.

In some exemplary embodiments of the present invention, the latency stabilization module 125 can comprise a frequency syntonization module 135. The frequency syntonization module 135 can be configured to syntonize a frequency of the source signal and a frequency of the display signal. In an exemplary embodiment of the present invention, the vertical synchronization components (VSync) of the source and display signals are syntonized by the frequency syntonization module 135. In some embodiments of the present invention, the frequency syntonization module 135 can be implemented as a control loop feedback mechanism, e.g. a proportional integral derivative ("PID") controller. In an exemplary embodiment of the present invention, as shown in FIG. 3, the frequency syntonization module 135 can be built on top of a classical PID regulation close loop algorithm. The measurement input point can be the time when the renderer VSync occurs (tRenderer(n)), aliased as the "TimeActualPos." The set point as input can be the time when the first pixel of the next image arrives from the network input (tWSof). The set point and the actual point can be subtracted to compute the current error. The error can be normalized to a signed fixed point value (S24.7). Then, a "TimeOffset" can be added to introduce inside the frequency syntonization module 135 from the result of computing by a phase correction module 145 (discussed below). The result "DeltaPhase(n)" can be computed by a PID filter to smooth the error compensation; thus, it is able to handle a sudden spike. The multiplication by Kp of the DeltaPhase(n) can bring the average smoothing factor to the loop. The multiplication by Ki of the integration over time of DeltaPhase(n) can weigh the contribution of the overall past error accumulation (faster convergence in transients). The multiplication by Kd can weigh the contribution of the predicted next error, which can help to smooth ringing oscillation during transients. The frequency syntonization module 135 of the latency stabilization module 125 can be configured to output a correction factor.

As shown in FIG. 2A, in some embodiments of the present invention, the correction factor from the frequency syntonization module 135 can be applied to a device that increments or decrements a pixel clock frequency component of the display signal. Thus, in some embodiments of the present invention, the correction factor may be a pixel clock correction factor. For example, this stage can be modeled as an integrator function, wherein the output of the integration is the input of the feedback loop (tRenderer(n) timestamp).

As shown in FIG. 2B, in some embodiments of the present invention, the correction factor from the frequency syntonization module 135 can be applied to a device that increments or decrements the blanking period of the display signal. Thus, in some embodiments of the present invention, the correction factor may be a blanking period correction factor.

In some exemplary embodiments of the present invention, the latency stabilization module 125 can comprise a frequency lock detection module 1140. The frequency lock detection module 140 can be configured to detect whether the frequency of the source signal and the frequency of the display signal are locked. For example, in some exemplary embodiments of the present invention, the frequency lock detection module 140 can be configured to detect whether the frequency of the source signal and the frequency of the display signal are locked by detecting whether the vertical synchronization (VSync) components of the source and display signals are locked. In an exemplary embodiment of the present invention, the frequency lock detection module 140 is configured to detect whether the frequency of the source signal and the frequency of the display signal are locked by evaluating the correction factor generated by the frequency syntonization module 135. In some exemplary embodiments of the present invention, the frequency of the source signal and the frequency of the display signal are locked if an absolute value of a derivative of the correction factor is below a predetermined threshold.

In accordance with the exemplary embodiment of the present invention shown in FIG. 3, the correction factor generated by the frequency syntonization module 135 can be derived by the frequency lock detection module 140. When the absolute value of this derivation function becomes below a predetermined threshold, the LockFilter variable can be incremented. Otherwise, the LockFilter variable can be decremented. The excursion of the LockFilter can be limited by zero as a lower limit and a programmable upper limit The "locked" Boolean can be set to TRUE or FALSE by using a hysteresis comparator function. For example, the lock can be set to TRUE when it increases and becomes greater than a high threshold. The lock can be reset to FALSE when it decreases and becomes less than a low threshold. This hysteresis can be used to avoid transition effect oscillations.

In some exemplary embodiments of the present invention, the latency stabilization module 125 can comprise a phase correction module 145 in communication with the frequency lock detection module 140 and the frequency syntonization module 135. In some embodiments of the present invention, the phase correction module 145 can be configured to synchronize a phase of the source signal and a phase of the display signal if the frequency of the source signal and the frequency of the display signal are locked.

In accordance with some exemplary embodiments of the present invention, the phase correction module 145 can comprise one or more sub-modules. For example, as shown in FIG. 3, the phase correction module 145 includes a network travel time and processing time sub-module 150, a latency sub-module 155, and a phase tuning sub-module 160. The sub-modules shown in FIG. 3 are intended to be illustrative and not limiting. Instead, as those skilled in the art would understand, the phase correction module 145 of the present invention can include different combinations of sub-modules which may carry out the various processes, functions, and/or steps described herein as relating to the phase correction module 145.

The network travel time and processing sub-module 150 of the phase correction module 145 can be configured to determine a best case display latency based on a travel time of the IP network 115 and a video processing time. For example, in the network travel time and processing sub-module 150 shown in FIG. 3, the time of image arrival at the renderer 110 (tWSof) can be subtracted from the time of the source image (tSource). The result can be clipped positive to avoid impossible out of range values, which could occur during transients. Then, the travel time value can be normalized to a signed fix point value (S24.7). The value can then be averaged over a 32 sample sliding window (MeanMinTravelTime) to get the average minimum network travel time. The scope of the present invention is not, however, limited to a 32 sample sliding window. Instead, as those skilled in the art would understand, the normalized travel time value can be averaged over many different sample window sizes, in accordance with various exemplary embodiments of the present invention. In the network travel time and processing sub-module 150, the time of end of arrival of the frame at the renderer (tWEof) can also be subtracted from the time of arrival of the first pixel of the previous frame (tWSof). The result can be normalized to a signed fixed point value (S24.7). This value can be denoted as the "InputWriteTime." To compute the "OutputReadTime," the "InputWriteTime" can be divided by the "ReadOverWriteTimeRatio" factor. A first estimation of a latency set point (LatencySP) can then be processed in accordance with the following formula: LatencySP=InputWriteTime−OutputReadTime+MeanMinTravelTime+LatencyMargin. The resulting value for the latency set point can then be compared with the latency expected point parameter. If the latency set point is less than the latency expected point, then the latency set point becomes the latency expected point. Otherwise, the latency set point remains unchanged. Thus, the phase correction module 145 can be configured to generate a display latency set point based on the best case display latency and the latency expected point parameter.

The latency sub-module 155 of the phase correction module 145 can be configured to determine the current actual display latency. In some embodiments of the present invention, the latency sub-module 155 can be is configured to determine the actual display latency by subtracting a source timestamp associated with a source frame from a display timestamp associated with a corresponding display frame, wherein the source timestamp and the display timestamp are generated by the common clock 120. For example, in the latency sub-module 155 shown in FIG. 3, VSync renderer time (tRenderer) can be subtracted from the VSync source time (tSource) to obtain the instantaneous latency time. A correction of the renderer VSync period time can then be applied to compensate the sampling time of the timestamps that is not done on the same frame. Then, the result can be normalized to a signed fixed point value representing the latency actual point (LatencyAP).

The phase tuning sub-module 160 of the phase correction module 145 can be configured to subtract the display latency set point (LatencySP) from the actual display latency (LatencyAP). As shown in the exemplary embodiment depicted in FIG. 3, the result can be divided by 128 (or other values in accordance with other exemplary embodiments of the present invention) to make an error latency filter. The "ErrorLatency" can also be clipped to avoid excessive latency variations.

In some embodiments of the present invention, the phase correction module 145 can be configured to generate correction data based in part on synchronization of the phase of the source signal and the phase of the display signal, if the frequency of the source signal and the frequency of the display signal are locked. For example, as shown in FIG. 3, ErrorLatency can be integrated to generate the "TimeOffSet" parameter (i.e. the correction data). If "Locked" (from the frequency lock detection module) is FALSE, "TimeOffset" can be forced to a fixed starting point value. When "Locked" becomes TRUE, "TimeOffset" can start varying with the integration of ErrorLatency. The "TimeOffset" can then be an input to the frequency syntonization module 135 to trigger phase adjustment. Thus, in some exemplary embodiments of the present invention, the frequency syntonization module 135 can be further configured to re-syntonize the frequency of the source signal and the frequency of the display signal using the correction data. Accordingly, as shown in FIG. 3, the frequency syntonization module 135 and the phase correction module 145 can be implemented as a double feedback loop, running each time the first pixel of a frame arrives from the IP network 115 (tWSof).

In some embodiments of the present invention, the frequency syntonization module 135 can be configured to adjust a pixel clock component of the display signal. FIG. 2A provides a system 200 implementing such an exemplary embodiment of the present invention. The output vector "correction" from the frequency syntonization module 135 can be processed by a comparator-integrator stage 205. At each of the plurality of frames, the frequency syntonization module 135 publishes a "correction" set point. The comparator-integrator 205 then generates an increment or decrement pulse at a given period, and increments/decrements in parallel an actual point "correction" vector. The actual point "correction" can follow the set point "correction" at the pace of the pulses. The tunable pixel clock generator 210 can be embodied on a programmable and tunable PLL based clock generator. Before starting processing on the source signal received from the IP network 115, the tunable pixel clock 210 can be programmed with a "center frequency." In accordance with various exemplary embodiments of the present invention, the "center frequency" can be chosen from standard frequencies commonly used to display video standards, including, but not limited to, CVT, DMT, Vesa, SMPTE (e.g. 1080p60 ↔ 148.5 MHz), and the like. The video standard can be determined at source level by measurement and transmitted at renderer level with an appropriate network protocol, e.g. Stream Announcement Protocol ("SAP"). The tunable pixel clock generator 210 can be tunable within a narrow range of frequency (e.g. ±4 MHz around the "center frequency"). This tuning can be implemented by register programming or by increment/decrement pulses (as shown in FIG. 2A). The precision of the tuning can be within a dynamic range of a predetermined number of bits. For example, a predetermined number of bits equal to 20 is equivalent to a tuning step of 8 Hz over a range of 8 MHz. The video synchro generator 215 can be embodied in a programmable state machine designed inside an FPGA. With, as inputs, the Front Porch, the Back Porch, the Total Width, the Total Height, and the VSync length, which are all parameters express in number of pixel clock cycles, this module can generate periodic video synchronization standard signals suitable for standard video interface, including, but not limited to, DVI, HDMI, and the like.

In some embodiments of the present invention, the frequency syntonization module 135 can be configured to adjust a blanking period of the display signal. FIG. 2B provides a system 200 implementing such an exemplary embodiment of the present invention. Many of the features of the embodiment shown in FIG. 2B are similar to those for pixel clock adjustment shown in FIG. 2A. The main difference, however, is with the tunable video synchro generator 220. This function can be embodied inside a programmable state machine (processor or FPGA based). The tunable video synchro generator 200 takes as inputs the Front Porch, the Back Porch, the Total Width, the Total Height, and the VSync length, all of which are parameters expressed in a number of pixel clock cycles. This module then generates periodic video synchronization standard signals suitable for standard video interface, including, but not limited to, DVI, HDMI, and the like. To be able to tune the VSync frequency accurately, the time that it takes process a line or the time it takes to add or suppress a line can be tuned. Increment and decrement requests can then adjust the "Total Width" and "Total Height" parameters, from one frame to the next within limits accepted by the display.

In addition to systems for stabilizing display latency, various embodiments of the present invention also provide methods for stabilizing display latency. An exemplary embodiment of the present invention provides a method of stabilizing display latency in a video transmission over an IP network 115. The method comprises receiving a source signal from a source 105 via an IP network 115, generating a display signal, and stabilizing a display latency between frames in the source signal and frames in the display signal.

The source signal can comprise data associated with a plurality of source frames. Each source frame in the plurality of source frames can be associated with a distinct timestamp from a common clock 120 shared between the source 105 and a renderer 110. Each source frame can also be indicative of an image to be displayed on a renderer 110.

The display signal can comprise data associated with a plurality of display frames. Each display frame can correspond to a source frame. The display signal can be configured to cause the renderer 110 to display the image from the source 105.

In an exemplary embodiment of the present invention, the method comprises stabilizing a display latency between the plurality of source frames in the source signal and the plurality of display frames in the display signal, such that the display latency is substantially non-oscillating.

In some embodiments of the present invention, stabilizing the display latency comprises syntonizing a frequency of the source signal and a frequency of the display signal, and detecting whether the frequency of the source signal and the frequency of the display signal are locked. In an exemplary embodiment of the present invention, detecting whether the frequency of the source signal and the frequency of the display signal are locked comprises detecting whether the vertical synchronization components of the source and display signals are locked. If the frequency of the source signal and the frequency of the display signal are locked, the method can further comprise synchronizing a phase of the source signal and a phase of the display signal, generating correction data based in part on synchronization of the phase of the source signal and the phase of the display signal, and re-syntonizing the frequency of the source signal and the frequency of the display signal using the correction data.

In an exemplary embodiment of the present invention, generating correction data comprises determining a best case display latency based on a travel time of the IP network 115 and a video processing time, generating a display latency set point based on the best case display latency and an expected latency parameter, determining an actual display latency, and subtracting the display latency set point from the actual display latency.

In another exemplary embodiment of the present invention, generating the display latency set point comprises setting the display latency set point equal to the expected latency if the display latency set point is less than the expected latency.

In yet another exemplary embodiment of the present invention, determining actual display latency comprises subtracting a source timestamp associated with a source frame from a display timestamp associated with a corresponding display frame, wherein the source timestamp and the display timestamp are generated by the common clock 120.

In still yet another exemplary embodiment of the present invention, detecting whether the frequency of the source signal and the frequency of the display signal are locked comprises evaluating a correction factor. In some exemplary embodiments of the present invention, the frequency of the source signal and the frequency of the display signal are locked if an absolute value of a derivative of the correction factor is below a predetermined threshold.

In another exemplary embodiment of the present invention, at least one of syntonizing and re-syntonizing the frequency of the source signal and the frequency of the display signal comprises adjusting a pixel clock component of the display signal.

In another exemplary embodiment of the present invention, at least one of syntonizing and re-syntonizing the frequency of the source signal and the frequency of the display signal comprises adjusting a blanking period of the display signal.

As discussed above, the present invention provides various modules and sub-modules configured to perform the various functions described herein. In addition to those functions described above, one or more of the various modules can be configured to perform one or more of the various methods also described herein. The modules can be implemented many ways in accordance with the various embodiments of the present invention. For example, in some embodiments of the present invention, one or more of the modules described herein can be implemented with software or firmware. In some exemplary embodiments of the present invention, one or more of the various modules described herein can comprise logical instructions stored in a memory that, when executed by a processor, can cause the processor or associated devices to perform the various functions described herein. In accordance with exemplary embodiments of the present invention, one or more of the various modules can be implemented with the use of many processing devices known in the art, including, but not limited to, digital signal processors, field programmable gate arrays, embedded microprocessors, and the like.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. A method of stabilizing display latency in a video transmission over an IP network, the method comprising:
    receiving a source signal from a source via an IP network, the signal comprising data associated with a plurality of source frames, each source frame in the plurality of source frames associated with a distinct timestamp from a common clock shared between the source and a renderer, each source frame indicative of an image to be displayed on a renderer;
    generating a display signal comprising data associated with a plurality of display frames, each display frame corresponding to a source frame, the display signal configured to cause the renderer to display the image; and
    stabilizing a display latency between the plurality of source frames in the source signal and the plurality of display frames in the display signal, such that the display latency is non-oscillating, comprising
        syntonizing a frequency of the source signal and a frequency of the display signal;
        detecting whether the frequency of the source signal and the frequency of the display signal are locked; and
        if the frequency of the source signal and the frequency of the display signal are locked:

synchronizing a phase of the source signal and a phase of the display signal;
generating correction data based in part on synchronization of the phase of the source signal and the phase of the display signal; and
re-syntonizing the frequency of the source signal and the frequency of the display signal using the correction data.

2. The method of claim 1, wherein the plurality of source frames in the source signal are timestamped via at least one of an RTP protocol and an RTCP protocol.

3. The method of claim 1, wherein the common clock is tuned by a network precision time protocol.

4. The method of claim 1, wherein the display latency is not greater than a time a display frame is displayed on the renderer.

5. The method of claim 1, wherein the display latency is greater than a time a display frame is displayed.

6. The method of claim 1, wherein generating correction data comprises:
determining a best case display latency based on a travel time of the IP network and a video processing time;
generating a display latency set point based on the best case display latency and an expected latency parameter;
determining an actual display latency; and
subtracting the display latency set point from the actual display latency.

7. The method of claim 6, wherein generating the display latency set point comprises setting the display latency set point equal to the expected latency if the display latency set point is less than the expected latency.

8. The method of claim 6, wherein determining actual display latency comprises subtracting a source timestamp associated with a source frame from a display timestamp associated with a corresponding display frame, wherein the source timestamp and the display timestamp are generated by the common clock.

9. The method of claim 1, wherein detecting whether the frequency of the source signal and the frequency of the display signal are locked comprises evaluating a correction factor.

10. The method of claim 9, wherein the frequency of the source signal and the frequency of the display signal are locked if an absolute value of a derivative of the correction factor is below a predetermine threshold.

11. The method of claim 1, wherein at least one of syntonizing and re-syntonizing the frequency of the source signal and the frequency of the display signal comprises adjusting a pixel clock component of the display signal.

12. The method of claim 1, wherein at least one of syntonizing and re-syntonizing the frequency of the source signal and the frequency of the display signal comprises adjusting a blanking period of the display signal.

13. A system for stabilizing display latency in a video transmission over an IP network, the system comprising:
a receiver configured to receive a source signal from a source via an IP network, the signal comprising data associated with a plurality of source frames, each source frame in the plurality of source frames associated with a distinct timestamp from a common clock shared between the source and a renderer, each source frame indicative of an image to be displayed on a renderer; and
a latency stabilization module configured to generate a display signal comprising data associated with a plurality of display frames, each display frame corresponding to a source frame, the display signal configured to cause the renderer to display the image, the latency stabilization module further configured to stabilize a display latency between the plurality of source frames in the source signal and the plurality of display frames in the display signal, such that the display latency is non-oscillating, the latency stabilization module comprising:
a frequency syntonization module configured to syntonize a frequency of the source signal and a frequency of the display signal;
a frequency lock detection module configured to detect whether the frequency of the source signal and the frequency of the display signal are locked; and
a phase correction module configured to, if the frequency of the source signal and the frequency of the display signal are locked:
synchronize a phase of the source signal and a phase of the display signal; and
generate correction data based in part on synchronization of the phase of the source signal and the phase of the display signal,
wherein the frequency syntonization module is further configured to re-syntonize the frequency of the source signal and the frequency of the display signal using the correction data.

14. The system of claim 13, wherein the plurality of source frames in the source signal are timestamped via at least one of an RTP protocol and an RTCP protocol.

15. The system of claim 13, wherein the common clock is tuned by a network precision time protocol.

16. The system of claim 13, wherein the display latency is not greater than a time a display frame is displayed on the renderer.

17. The system of claim 13, wherein the display latency is greater than a time a display frame is displayed on the renderer.

18. The system of claim 13, wherein the phase correction module is further configured to:
determine a best case display latency based on a travel time of the IP network and a video processing time;
generate a display latency set point based on the best case display latency and an expected latency parameter;
determine an actual display latency; and
subtract the display latency set point from the actual display latency.

19. The system of claim 18, wherein the phase correction module is configured to generate the display latency set point by setting the display latency set point equal to the expected latency if the display latency set point is less than the expected latency.

20. The system of claim 18, wherein the phase correction module is configured to determine the actual display latency by subtracting a source timestamp associated with a source frame from a display timestamp associated with a corresponding display frame, wherein the source timestamp and the display timestamp are generated by the common clock.

21. The system of claim 13, wherein the frequency lock detection module is configured to detect whether the frequency of the source signal and the frequency of the display signal are locked by evaluating a correction factor generated by the frequency syntonization module.

22. The system of claim 21, wherein the frequency of the source signal and the frequency of the display signal are locked if an absolute value of a derivative of the correction factor is below a predetermined threshold.

23. The system of claim 13, wherein the frequency syntonization module is configured to adjust a pixel clock component of the display signal.

24. The system of claim 13, wherein the frequency syntonization module is configured to adjust a blanking period of the display signal.

25. A method of stabilizing display latency between a source and a renderer over an IP network, the method comprising:
    syntonizing a frequency of the source signal and a frequency of the display signal;
    detecting whether the frequency of the source signal and the frequency of the display signal are locked; and
    if the frequency of the source signal and the frequency of the display signal are locked:
        synchronizing a phase of the source signal and a phase of the display signal;
        generating correction data based in part on synchronization of the phase of the source signal and the phase of the display signal; and
        re-syntonizing the frequency of the source signal and the frequency of the display signal using the correction data,
    wherein the display latency between the source and the renderer is non-oscillating.

26. A latency stabilization system for stabilizing the display latency between a source and a renderer over an IP network, the latency stabilization system comprising:
    a frequency syntonization module configured to syntonize a frequency of a source signal from the source and a frequency of a display signal to be displayed on the renderer;
    a frequency lock detection module configured to detect whether the frequency of the source signal and the frequency of the display signal are locked; and
    a phase correction module configured to, if the frequency of the source signal and the frequency of the display signal are locked:
        synchronize a phase of the source signal and a phase of the display signal; and
        generate correction data based in part on synchronization of the phase of the source signal and the phase of the display signal,
    wherein the frequency syntonization module is further configured to re-syntonize the frequency of the source signal and the frequency of the display signal using the correction data, and
    wherein the display latency between the source and the renderer is non-oscillating.

* * * * *